United States Patent
Worku et al.

(10) Patent No.: US 8,710,125 B2
(45) Date of Patent: Apr. 29, 2014

(54) TPO COMPOSITIONS, ARTICLES, AND METHODS OF MAKING THE SAME

(75) Inventors: Anteneh Z. Worku, Pearland, TX (US); Kim L. Walton, Lake Jackson, TX (US); Henry G. Heck, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/377,911

(22) PCT Filed: Jul. 1, 2010

(86) PCT No.: PCT/US2010/040755
§ 371 (c)(1),
(2), (4) Date: Dec. 13, 2011

(87) PCT Pub. No.: WO2011/002983
PCT Pub. Date: Jan. 6, 2011

(65) Prior Publication Data
US 2012/0088868 A1    Apr. 12, 2012

Related U.S. Application Data

(60) Provisional application No. 61/222,677, filed on Jul. 2, 2009.

(51) Int. Cl.
*C08K 5/34* (2006.01)
*C08K 5/55* (2006.01)
*C08G 18/62* (2006.01)

(52) U.S. Cl.
USPC ............ 524/101; 524/186; 524/197; 524/515

(58) Field of Classification Search
USPC .................................. 524/515, 101, 197, 186
See application file for complete search history.

(56) References Cited

U.S. PATENT DOCUMENTS

| | | | |
|---|---|---|---|
| 3,645,992 A | 2/1972 | Elston | |
| 4,076,698 A | 2/1978 | Anderson et al. | |
| 6,680,361 B1 | 1/2004 | Cady et al. | |
| 2002/0015348 A1 | 2/2002 | Gillingham et al. | |
| 2007/0029171 A1 | 2/2007 | Nemedi | |
| 2007/0276063 A1* | 11/2007 | Schauder et al. | 524/3 |

FOREIGN PATENT DOCUMENTS

| | | |
|---|---|---|
| EP | 1081183 A2 | 3/2001 |
| EP | 1719800 A1 | 11/2006 |
| EP | 1950242 A1 | 7/2008 |
| EP | 2045288 A1 | 4/2009 |
| WO | 0026268 A1 | 5/2000 |
| WO | 2005061606 A1 | 7/2005 |
| WO | WO 2008079998 A1 * | 7/2008 |

OTHER PUBLICATIONS

PCT/US/2010/040755, International Search Report and Written Opinion.
PCT/US/2010/040755, International Preliminary Report on Patentability.

* cited by examiner

*Primary Examiner* — Ling Choi
*Assistant Examiner* — Ronald Grinsted

(57) ABSTRACT

The invention provides a polyolefin composition comprising: A) a propylene-based polymer having a flex modulus of greater than 1500 MPa and an HDT of greater than 100° C.; B) an ethylene/α-olefin interpolymer having Tg of less than −30° C., a tan delta, measured at 0.1 radians/s at 190° C., of less than 3, an HDT that is greater than, or equal to, the peak melting temperature of the ethylene/α-olefin interpolymer, measured by differential scanning calorimetry; and C) a fiber filler; and D) a nitrogen source and/or a phosphorus source, wherein at least one source is derived from at least one organic compound, or salt thereof; and wherein the weight ratio of the propylene-based polmer:ethylene/α-olefin interpolymer (A:B) is from 9:1 to 6:4.

18 Claims, No Drawings

TPO COMPOSITIONS, ARTICLES, AND METHODS OF MAKING THE SAME

REFERENCE TO RELATED APPLICATIONS

This application claims the benefit of U.S. Provisional Application No. 61/222,677, filed on Jul. 2, 2009, and fully incorporated herein by reference.

BACKGROUND OF THE INVENTION

This invention relates to thermoplastic olefin (TPO) compositions with excellent flame retardant properties.

Thermoplastic olefin compositions are used in many applications, including automotive and footwear applications. A new emerging field is the use of these compositions for electrical applications, such as injection molded containers for electrical components and devices. These applications require that the composition have good flame retardant properties, as indicated by a UL 94 rating of "V-0," which means that a test bar formed from the composition, self-extinguishes, in the vertical position, after a repeated exposure to a flame.

International Publication No. WO2008/07998 discloses compositions containing platy fillers. These compositions contain a propylene homopolymer, an ethylene/α-olefin interpolymer a platy filler, and a nitrogen source and a phosphorus source.

European Patent Application No. EP1081183A2 discloses compositions that contain fillers, such as glass fibers, and a flame retarding effective additive of at least one polyphosphate, a sulfur containing compound, catalyst and a nitrogen containing compound such as melamine. Polymers include those selected from the group consisting of polyamides, polybutylene terephtalate, polyethylene terephtalate, polypropylene, polyethylene, polystyrenics, polyurethanes and polyacrylics, polycarbonates, polyarylates, polysulfones, polyetherketone, polyetheretherketone, polyphenylene oxide, polyphenylene sulfide, epoxy resins and thermosets, and blends thereof. Additional fillers include mineral fibers, carbon fibers, aramide fibers, gypsum, wollastonite, and lignin-containing fibers.

U.S. Publication No. 2007/0299171 discloses a composition comprising a formulation based on a phosphinic acid salt and melamine derivatives. The composition can be used for producing articles used for electric or electronic connections.

U.S. Publication 2002/0155348 discloses a battery casing formed from a composition that contains a blend of a homopolymer, copolymer and ammonium polyphosphate. Other components include polyol, intumescent char-forming agent, and melamine, which act as a blowing agent. Alternatively, the battery casing contains a polymer composition containing a halogen-containing fire-retardant component and a polypropylene component.

Additional compositions are described in EP1719800A1.

There remains a need for thermoplastic polyolefin compositions that have excellent flame retardant properties. Also, there is a need for such compositions that have high filler loadings to meet tensile properties, such as flexural modulus. Moreover, there is a need for highly filled compositions that contain fillers that do not interfere with the flame retardant properties of the flame retardants. These needs have been met by the following invention.

SUMMARY OF THE INVENTION

The invention provides a composition comprising:
A) a propylene-based polymer having a flex modulus of greater than 1500 MPa and an HDT of greater than 100° C.;
B) an ethylene/α-olefin interpolymer having Tg of less than −30° C., a tan delta, measured at 0.1 radians/s at 190° C., of less than 3, an HDT that is greater than, or equal to, the peak melting temperature of the ethylene/α-olefin interpolymer, measured by differential scanning calorimetry; and
C) a fiber filler; and
D) a nitrogen source and/or a phosphorus source, wherein at least one source is derived from at least one organic compound, or salt thereof; and
wherein the weight ratio of the propylene-based polymer: ethylene/α-olefin interpolymer (A:B) is from 9:1 to 6:4.

The invention also provides a polyolefin composition comprising:
A) a propylene-based polymer having a flex modulus of greater than 1500 MPa and an HDT of greater than 100° C.;
B) an ethylene/α-olefin interpolymer having Tg of less than −30° C., a tan delta, measured at 0.1 radians/s at 190° C., of less than 3; and
C) a fiber filler; and
D) a nitrogen source and/or a phosphorus source, wherein at least one source is derived from at least one organic compound, or salt thereof; and
wherein the weight ratio of the propylene-based polymer: ethylene/α-olefin interpolymer (A:B) is from 9:1 to 6:4.

DETAILED DESCRIPTION OF THE INVENTION

As discussed above, the invention provides, in a first aspect, a polyolefin composition comprising:
A) a propylene-based polymer having a flex modulus of greater than 1500 MPa and an HDT of greater than 100° C.;
B) an ethylene/α-olefin interpolymer having Tg of less than −30° C., a tan delta, measured at 0.1 radians/s at 190° C., of less than 3, an HDT that is greater than, or equal to, the peak melting temperature of the ethylene/α-olefin interpolymer, measured by differential scanning calorimetry; and
C) a fiber filler, and
D) a nitrogen source and/or a phosphorus source, wherein at least one source is derived from (is the compound or a derivative of such compound) at least one organic compound, or salt thereof, and
wherein the weight ratio of the propylene-based polymer: ethylene/α-olefin interpolymer (A:B) is from 9:1 to 6:4.

The invention also provides, in a second aspect, a polyolefin composition comprising:
A) a propylene-based polymer having a flex modulus of greater than 1500 MPa and an HDT of greater than 100° C.;
B) an ethylene/α-olefin interpolymer having Tg of less than −30° C., a tan delta, measured at 0.1 radians/s at 190° C., of less than 3, and
C) a fiber filler, and
D) a nitrogen source and/or a phosphorus source, wherein at least one source is derived from at least one organic compound, or salt thereof, and
wherein the weight ratio of the propylene-based polymer: ethylene/α-olefin interpolymer (A:B) is from 9:1 to 6:4.

The embodiments described herein apply to both the above first aspect and above second aspect of the invention.

In a preferred embodiment, the filler is a calcium-based filler. In a further embodiment, the fiber filler is a wollastonite.

In one embodiment, the filler is present in an amount greater than, or equal to, 10 weight percent, preferably greater than, or equal to, 15 weight percent, and more preferably greater than, or equal to, 20 weight percent, based on the weight of the composition.

In one embodiment, the sum weight of components A, B, C and D is greater than, or equal to, 95 weight percent, preferably greater than, or equal to, 98 weight percent based, and more preferably greater than, or equal to, 99 weight percent, based on the weight of the composition.

In one embodiment, the composition has a heat deflection temperature (HDT) of greater than about 100° C., and a flexural modulus of greater than about 1930 MPa.

In one embodiment, the composition has a UL-94 rating of V-0.

In one embodiment, the composition comprises a sufficient amount of the filler, such that the composition has a flexural modulus efficiency factor of 3 or more, and an HDT efficiency factor of 1.5 or more.

The reinforcing efficiency of the filler on the composition is evaluated by measuring the effect of a "20 weight percent" addition of the filler on the flex modulus and HDT of the blend of the propylene-based polymer and the ethylene/α-olefin interpolymer. The flex modulus of the blend with, and without, filler is measured. A flex modulus efficiency factor, with units of percent increase in modulus to percent loading of filler, can then be calculated. This factor is relatively linear in a filler loading range from about 10 to 40 weight percent. A related HDT efficiency factor can similarly be calculated for each filler grade by compounding the propylene-based polymer and the ethylene/α-olefin interpolymer with the reinforcing filler at "20 weight percent," and without the filler, and measuring each HDT.

In one embodiment, the fiber filler is present in an amount greater than 15 weight percent, preferably greater than, or equal to, 18 weight percent, and more preferably greater than, or equal to, 20 weight percent, based on the weight of the composition.

An inventive composition may comprise a combination of two or more embodiments as described herein.

In one embodiment, the nitrogen source is derived from melamine, isocyanuric acid, an isocyanate, or a triazine.

In one embodiment, the nitrogen source is derived from at least one organic compound selected from melamine, melamine cyanurate, melamine borate, melamine phosphate, melamine polyphosphate, melamine pyrophosphate, ethylene diamine, or tris(hydroxyethyl)isocyanurate.

In one embodiment, the phosphorus source is derived from at least one compound selected from a phosphate compound, a phosphinate compound, a phosphonate compound, a polyphosphate compound, or a phosphine oxide.

In one embodiment, the nitrogen source and/or the phosphorus source is derived from an amine salt of phosphoric acid, an amine salt of a polyphosphoric acid, an ammonium salt of phosphoric acid, or an ammonium salt of polyphosphoric acid.

In one embodiment, the phosphorus source is derived from at least one compound selected from ammonium polyphosphate, bis-phenol A diphenylphosphate, melamine phosphate, melamine polyphosphate, or melamine pyrophosphate.

In one embodiment, both the nitrogen source and the phosphate source are derived from the same compound.

In one embodiment, both the nitrogen source and the phosphate source are derived from at least one compound selected from ammonium polyphosphate, melamine phosphate, melamine polyphosphate, ethylenediamine phosphate, or melamine pyrophosphate.

In one embodiment, the nitrogen source and the phosphorous source are present as a preformulated additive (for example, a masterbatch formulation).

In a preferred embodiment, the propylene-based polymer is a propylene homopolymer.

In one embodiment, the propylene-based polymer is a propylene homopolymer that has a flex modulus of greater than 1930 MPa.

In one embodiment, the propylene homopolymer has an isotacticity index greater than 98 percent, as measured by 13C NMR, and correlated with xylene solubility (ASTM D5492).

In one embodiment, the propylene homopolymer has a flex modulus of greater than, or equal to, 2070 MPa, and an HDT of greater than 110° C. In a further embodiment, the propylene homopolymer has a flex modulus of greater than 2210 MPa, and an HDT of greater than 120° C.

In one embodiment, the ethylene/α-olefin interpolymer has a tan delta, measured at 0.1 radians/s at 190° C., of less than 2.

In one embodiment, the ethylene/α-olefin interpolymer has a tan delta, measured at 0.1 radians/s at 190° C., of less than 3, preferably less than 2.5, more preferably less than 2.2.

In one embodiment, the α-olefin of the ethylene/α-olefin interpolymer is a C3-C20 α-olefin. In a further embodiment, the α-olefin of the ethylene/α-olefin interpolymer is selected from the group consisting of propylene, 1-butene, 1-hexene and 1-octene.

In one embodiment, the ethylene/α-olefin interpolymer has a glass transition temperature (Tg) of less than −40° C., preferably less than −50° C.

In one embodiment, the difference between the HDT and the melting point (Tm) of the ethylene/α-olefin interpolymer is at least 4. In one embodiment, the difference between the HDT and the melting point (Tm) of the ethylene/α-olefin interpolymer is at least 8.

In one embodiment, the tan delta, measured at 190° C. and 0.10 radians/second, of the ethylene/α-olefin interpolymer is 3 or less, and preferably 2 or less. In one embodiment, the tan delta, measured at 190° C. and 0.10 radians/second, of the ethylene/α-olefin interpolymer is 2.5 or less, preferably 1.8 or less.

In one embodiment, the composition has a "UL-94 rating" of V-0.

In one embodiment, the composition has a flexural modulus greater than, or equal to, 290 kpsi (2000 MPa), preferably greater than, or equal to, 300 kpsi (2069 MPa), more preferably greater than, or equal to, 320 kpsi (2207 MPa), and even more preferably greater than, or equal to, 350 kpsi (2414 MPa).

An inventive composition may comprise a combination of two or more embodiments as described herein.

The invention also provides an article comprising at least one component formed from an inventive composition.

The invention also provides a molded article, comprising at least one component formed from an inventive composition, and wherein the article is selected from the group consisting of electronic parts, electronic casings, computer parts, building or construction materials, home appliances, containers, furniture, footwear components, and toys. In a further embodiment, the article is in an electronic part or electronic casing. In another embodiment, the article is a building or construction material.

Articles can be prepared by injection molding, extrusion, extrusion followed by thermoforming, low pressure molding, compression molding, and by other means known in the art.

The invention also provides a molded article comprising at least one component formed from an inventive composition. In a further embodiment, the article is formed by an injection molding process.

An inventive article, including molded articles, may comprise a combination of two or more embodiments as described herein.

The invention also provides a method of forming an inventive composition, comprising polymerizing the propylene-based polymer and the ethylene/α-olefin interpolymer in separate reactors, and subsequently mixing the propylene-based polymer and the ethylene/α-olefin interpolymer together with the fiber filler, nitrogen source and/or phosphate source.

In one embodiment, the invention also provides a method for preparing an inventive composition, utilizing a co-rotating, intermeshing, twin screw extruder.

The invention provides a method of making an inventive composition, said method comprising mixing the components of the composition in a twin screw extruder. In a further embodiment, the nitrogen source and/or phosphorous source are added to the extruder using a first side arm extruder. In one embodiment, the filler is added to the extruder using a second side arm extruder.

An inventive method may comprise a combination of two or more embodiments as described herein.

Fiber Fillers

In one embodiment, the fiber filler is a calcium-based filler. Calcium-based fillers comprise calcium, and typically calcium in the form of a calcium oxide.

In one embodiment, the fiber filler is wollastonite.

Wollastonite fiber fillers are available from R.T. Vanderbilt Company, Inc., and NYCO.

Wollastonite is a calcium inosilicate mineral ($CaSiO_3$) that may contain small amounts of iron, magnesium, and manganese substituting for calcium.

In one embodiment, the fiber filler is a mineral fiber.

Associated minerals include garnets, vesuvianite, diopside, tremolite, epidote, plagioclase feldspar, pyroxene and calcite.

In one embodiment, the fiber filler comprises at least one mineral selected from the group consisting of the following: garnets, vesuvianite, diopside, tremolite, epidote, plagioclase feldspar, pyroxene, calcite, calcium inosilicate and mixtures thereof.

In one embodiment, the fiber filler comprises at least one mineral selected from the group consisting of the following: vesuvianite, diopside, tremolite, epidote, plagioclase feldspar, pyroxene, calcite, calcium inosilicate and mixtures thereof.

In one embodiment, the fiber filler comprises at least one mineral selected from the group consisting of the following: plagioclase feldspar, pyroxene, calcite, calcium inosilicate and mixtures thereof.

In one embodiment, the fiber filler comprises at least one mineral selected from the group consisting of the following: calcite, calcium inosilicate and mixtures thereof.

In one embodiment, the fiber filler comprises calcium inosilicate, magnesium inosilicate, or mixtures thereof.

In one embodiment, the fiber filler has an aspect ratio (length/diameter) from 3:1 to 20:1, preferably from 5:1 to 20:1.

In one embodiment, the fiber filler is a wollastonite powder. In a further embodiment, the wollastonite powder has an aspect ratio from 3:1 to 5:1.

In one embodiment, the fiber filler is an acicular wollastonite powder. In a further embodiment, the acicular wollastonite powder has an aspect ratio from 15:1 to 20:1.

A fiber filler can be surface treated with a silane, an organosilicone or a titanate, and preferably treated with a solution of a silane, an organosilicone or a titanate. Useful silanes include, but are not limited to, vinyldimethoxysilane, vinyltrimethoxysilane, vinyldiethoxysilane, vinyltriethoxysilane, alkylsilanes, and aminosilanes.

In one embodiment, the fiber filler is treated with a silane. In a further embodiment, the fiber filler is a silane treated wollastonite.

In one embodiment, the fiber filler is treated with a silane selected from the group consisting of vinyldimethoxysilane, vinyltrimethoxysilane, vinyldiethoxysilane, vinyltriethoxysilane, alkylsilanes, and aminosilanes. In a further embodiment, the fiber filler is a silane treated wollastonite.

In one embodiment, the fiber filler is treated with a silane selected from the group consisting of alkylsilanes, and aminosilanes. In a further embodiment, the fiber filler is a silane treated wollastonite.

A fiber filler may comprise a combination of two or more embodiments as described herein.

Flame Retardant Additives

Table 1 gives a list of halogen free additives useful in the composition of the invention. Most of the flame retardants are organic based, and are thus useful for partitioning into the polymeric phase of the composition. Other flame retardants are described in EP1719800A1, incorporated herein by reference.

In general, suitable phosphorus-containing compounds include phosphates, phosphinates, phosphonates and phosphine oxides.

Table 1 below divides the Intumescent Additives by type of functionality. When an additive contains mixed functionality, it is listed under each category and under the combine category. For example, melamine polyphosphate is therefore listed under Phosphorous, Nitrogen, and mixed "Phosphorous plus Nitrogen."

In one embodiment of the inventive composition, Component D is derived from a nitrogen source.

In one embodiment, Component D is derived from a phorphorus source.

In one embodiment, Component D is derived from a nitrogen source and a phorphorus source.

TABLE 1

| Flame Retardant Additives | |
|---|---|
| Phosphorous Containing Additives | |
| | Phosphine oxides |
| | BAPP Bisphenol A Phenyl Phosphate |
| EXOLIT AP760[1] | Ammonium polyphosphate (APP) |
| MELAPUR MP[2] | Melamine phosphate |
| MELAPUR 200[2] | Melamine polyphosphate |
| | Melamine pyrophosphate |
| Nitrogen Containing Additives | |
| FYROL MC[3]/MELAPUR MC XL[2] | Melamine cyanurate |
| | Melamine |
| FYROL MP[3] | Melamine phosphate |
| | Melamine polyphosphate |
| | Melamine pyrophosphate |
| | Isocyanurates |
| | Triazine ring containing compounds |

TABLE 1-continued

Flame Retardant Additives

Cyanuric acid
Tris(hydroxyethyl) isocyanurate
Phosphorous Plus Nitrogen

| EXOLIT AP760[1] | Ammonium polyphosphate (APP) |
| MELAPUR MP[2] | Melamine phosphate |
| MELAPUR 200[2] | Melamine polyphosphate |
| | Melamine pyrophosphate |

[1]Available from Clariant
[2]Available from Ciba Specialty Chemicals
[3]Available from Supresta Propylene-Based Polymer Propylene-based polymers include propylene homopolymers and propylene-based interpolymers. Some examples of propylene-based polymers include INSPIRE Performance Polymers (for example, INSPIRE D221, INSPIRE 114, and INSPIRE 216), and other performance polypropylenes available from The Dow Chemical Company, and PROFAX PD702 and PROFAX SB912 polymers (both available from LyondellBasell).

In one embodiment, the propylene-based polymer has a melt flow rate, MFR, greater than, or equal to, 0.1 g/10 min, preferably greater than, or equal to, 0.2 g/10 min, and more preferably greater than, or equal to 0.5 g/10 min. In one embodiment, the propylene-based polymer is a propylene homopolymer. In another embodiment, the propylene-based polymer is a propylene-based interpolymer.

In one embodiment, the propylene-based polymer has a melt flow rate, MFR, less than, or equal to 5 g/10 min, preferably less than, or equal to, 4 g/10 min, more preferably less than, or equal to, 3 g/10 min. In one embodiment, the propylene-based polymer is a propylene homopolymer. In another embodiment, the propylene-based polymer is a propylene-based interpolymer.

In one embodiment, the propylene-based polymer has a melt flow rate, MFR, less than, or equal to 12 g/10 min, preferably less than, or equal to, 10 g/10 min, more preferably less than, or equal to, 8 g/10 min. In one embodiment, the propylene-based polymer is a propylene homopolymer. In another embodiment, the propylene-based polymer is a propylene-based interpolymer.

In one embodiment, the propylene-based polymer has a melt flow rate (MFR) (230° C./2.16 kg weight) from 0.1 to 5, preferably from 0.2 to 4 g/10 min, more preferably from 0.5 to 3 g/10 min. All individual values and subranges from 0.1 to 5 g/10 min are included herein and disclosed herein. In one embodiment, the propylene-based polymer is a propylene homopolymer. In another embodiment, the propylene-based polymer is a propylene-based interpolymer.

In one embodiment, propylene-based polymer has a melting point greater than 145° C. In another embodiment, the propylene-based polymer has a melting point, Tm, from 130° C. to 180° C., preferably from 140° C. to 170° C. In one embodiment, the propylene-based polymer is a propylene homopolymer. In another embodiment, the propylene-based polymer is a propylene-based interpolymer.

In one embodiment, the propylene-based polymer has a crystallization temperature, Tc, greater than, or equal to, 110° C., preferably greater than, or equal to, 120° C., and more preferably greater than, or equal to, 130° C., and most preferably greater than, or equal to, 140° C. In one embodiment, the propylene-based polymer is a propylene homopolymer. In another embodiment, the propylene-based polymer is a propylene-based interpolymer.

Polymerization processes, used to produce high melting polymers, include the slurry process, which is run at about 50-90° C. and 0.5-1.5 MPa (5-15 atm), and both the gas-phase and liquid-monomer processes in which extra care must be given to the removal of amorphous polymer. The propylene-based polymer may also be prepared by using any of a variety of single site, metallocene and constrained geometry catalysts together with their associated processes. Polymerizations may take place in a stirred tank reactor, a gas phase reactor, a single continuously stirred tank reactor, a single slurry loop reactor, and other suitable reactors.

In one embodiment, the propylene-based polymer has a molecular weight distribution (Mw/Mn) from 2 to 6, more preferably from 2 to 5 and most preferably from 3 to 5. All individual values and subranges from 2 to 6 are included herein and disclosed herein. In another embodiment, the molecular weight distribution is less than, or equal to, 6, and more preferably less than, or equal to, 5.5, and more preferably less than, or equal to 5. In one embodiment, the propylene-based polymer is a propylene homopolymer. In another embodiment, the propylene-based polymer is a propylene-based interpolymer.

In one embodiment, the propylene-based polymer has a density greater than, or equal to, 0.88 g/cc, preferably greater than, or equal to, 0.89 g/cc. In one embodiment, the propylene-based polymer is a propylene homopolymer. In another embodiment, the propylene-based polymer is a propylene-based interpolymer.

In one embodiment, the propylene-based polymer has a density less than, or equal to, 0.92 g/cc, preferably less than, or equal to, 0.91 g/cc. In one embodiment, the propylene-based polymer is a propylene homopolymer. In another embodiment, the propylene-based polymer is a propylene-based interpolymer.

In one embodiment, the propylene-based polymer has a density from 0.88 to 0.92 g/cc, and preferably from 0.89 to 0.91 g/cc. All individual values and subranges from 0.88 to 0.92 g/cc are included herein and disclosed herein. In one embodiment, the propylene-based polymer is a propylene homopolymer. In another embodiment, the propylene-based polymer is a propylene-based interpolymer.

Preferred grades of highly crystalline, isotactic homopolymer have a flexural modulus greater than, or equal to, about 2070 MPa (300 kpsi), and an HDT greater than about 110° C. The most preferred grades of highly crystalline, isotactic homopolymer polypropylene have a flexural modulus greater than about 2210 MPa (320 kpsi) and an HDT greater than about 120° C.

In one embodiment, the propylene homopolymer has a HDT greater than about 90° C., preferably greater than about 100° C., more preferably greater than about 110° C., even more preferably greater than about 120° C., and most preferably greater than about 130° C.

In another embodiment, the propylene homopolymer has a flexural modulus greater than about 1720 MPa (250 kpsi), preferably greater than about 1930 MPa (280 kpsi), more preferably greater than about 2000 MPa (290 kpsi), and most preferably greater than about 2210 MPa (320 kpsi).

A propylene-based polymer may comprise a combination of two or more embodiments as described herein.

A propylene homopolymer may comprise a combination of two or more embodiments as described herein.

A propylene-based interpolymer may comprise a combination of two or more embodiments as described herein.

Ethylene/α-Olefin Interpolymer

The compositions of the invention comprise at least one ethylene/α-olefin interpolymer, which optionally may contain a diene. "Interpolymer," as used herein, refers to a polymer having polymerized therein at least two monomers. It includes, for example, copolymers, terpolymers and tetrapolymers. It particularly includes a polymer prepared by polymerizing ethylene with at least one comonomer, typically an alpha olefin (α-olefin) of 3 to 20 carbon atoms (C3-C20), preferably 3 to 8 carbon atoms (C3-C8). In one embodiment, α-olefin is a C4-C8 α-olefin.

Interpolymers include ethylene/butene (EB) copolymers, ethylene/hexene-1 (EH), ethylene/octene (EO) copolymers, ethylene/alpha-olefin/diene modified (EAODM) interpolymers such as ethylene/propylene/diene modified (EPDM) interpolymers and ethylene/propylene/octene terpolymers. Preferred copolymers include EP (ethylene/propylene), EB (ethylene/butene), EH (ethylene/hexane) and EO (ethylene/octene) copolymers. Suitable diene monomers include conjugated and nonconjugated dienes, and preferably nonconjugated dienes. Preferred nonconjugated dienes include ENB, 1,4-hexadiene, 7-methyl-1,6-octadiene, and more preferably the diene is ENB. Suitable conjugated dienes include 1,3-pentadiene, 1,3-butadiene, 2-methyl-1,3-butadiene, 4-methyl-1,3-pentadiene, or 1,3-cyclopentadiene.

In one embodiment, the ethylene/α-olefin interpolymer is an ethylene/α-olefin copolymer. In a further embodiment, α-olefin is a C3-C20 α-olefin, preferably a C4-C8 α-olefin. In a further embodiment, the copolymer is selected from EB, EH or EO copolymers.

The superior resistance to low temperature impact is contributed by modification of the highly crystalline, isotactic homopolymer polypropylene with an EAO elastomeric impact modifier (or ethylene/α-olefin interpolymer). To provide the needed impact resistance at −30° C., the EAO elastomeric impact modifier preferably has a glass transition temperature (Tg) of less than −30° C., more preferably less than −40° C., and most preferably less than −50° C.

In addition, two other characteristics of the elastomeric impact modifier affect the properties of the composition. First, because the EAO elastomeric impact modifier will be above its melting point well before the highly crystalline, isotactic propylene homopolymer begins to melt, it is desirable to select a grade with an HDT significantly greater than its melting point. In one embodiment, preferred grades of EAO elastomeric impact modifiers have a positive delta, more preferred grades have a delta of 4 or more, even more preferred grades have a delta of 6 or more, and the most preferred grades have a delta of 8 or more. Suitable polymers ethylene/α-olefin interpolymers include ENGAGE 8100 and ENGAGE 8842 Polyolefin Elastomers and ENR 7380 Developmental Polyolefin Elastomer, all from The Dow Chemical Company.

Second, the tan delta of the elastomer (ethylene/α-olefin interpolymer), measured at 0.1 radian per second (rad/sec) at 190° C., correlates with the gloss of the finished injection molded part. The lower the tan delta, the lower the gloss of the molded part.

The preferred grades of EAO elastomeric impact modifiers have Tg and delta properties as described above, and also have a tan delta, measured at 190° C. and 0.1 radians/second, of about 3 or less, preferably 2.5 or less, more preferably 2 or less, and even more preferably of about 1.8, or less and most preferably of about 1.6 or less.

In one embodiment, the ethylene/α-olefin interpolymer has a molecular weight distribution (Mw/Mn) from 1 to 5, more preferably from 1.5 to 4 and most preferably from 2 to 3. All individual values and subranges from 1 to 5 are included herein and disclosed herein.

In one embodiment, the ethylene/α-olefin interpolymer has a density greater than, or equal to. 0.80 g/cc, preferably greater than, or equal to, 0.82 g/cc, and more preferably greater than, or equal to 0.83 g/cc.

In one embodiment, the ethylene/α-olefin interpolymer has a density less than, or equal to. 0.90 g/cc, preferably less than, or equal to, 0.88 g/cc, and more preferably less than, or equal to, 0.87 g/cc.

In one embodiment, the ethylene/α-olefin interpolymer has a density from 0.80 to 0.90 g/cc, preferably from 0.82 to 0.88 g/cc, and more preferably from 0.83 to 0.87 g/cc. All individual values and subranges from 0.80 to 0.90 g/cc are included herein and disclosed herein. In another embodiment, the ethylene/α-olefin interpolymer has a density less than, or equal to, 0.875 g/cc, preferably less than, or equal to, 0.86 g/cc, and more preferably less than, or equal to, 0.85 g/cc.

In one embodiment, the ethylene/α-olefin interpolymer has a melt index, 12, greater than, or equal to, 0.05 g/10 min, preferably greater than, or equal to, 0.1 g/10 min, and more preferably greater than, or equal to 0.2 g/10 min.

In one embodiment, the ethylene/α-olefin interpolymer has a melt index, 12, less than, or equal to 10 g/10 min, preferably less than, or equal to, 5 g/10 min, and more preferably less than, or equal to, 2 g/10 min.

In one embodiment, the ethylene/α-olefin interpolymer has a melt index, 12 (190° C./2.16 kg) from 0.05 to 10 g/10 min, preferably from 0.1 to 5 g/10 min, and more preferably from 0.2 to 2 g/10 min, or 0.5 to 1 g/10 min. All individual values and subranges from 0.05 to 10 g/10 min are included herein and disclosed herein. In another embodiment, the elastomer component has a melt index, 12, of 1 g/10 min or less, preferably of 0.5 g/10 min or less, and more preferably of 0.3 g/10 min or less.

In one embodiment, the ethylene/α-olefin interpolymer has a Mooney Viscosity (ML 1+4 at 125° C.) from 10 to 100, preferably from 20 to 70, more preferably from 30 to 60 (ASTM D1646).

In one embodiment, the ethylene/α-olefin interpolymer has a Tg less than −30° C., preferably less than −40° C., and more preferably less than −50° C.

In one embodiment, the ethylene/α-olefin interpolymer is a homogeneously branched linear or homogeneously branched substantially linear ethylene/α-olefin interpolymer.

In one embodiment, the ethylene/α-olefin interpolymer is a homogeneously branched linear ethylene/α-olefin interpolymer.

In one embodiment, the ethylene/α-olefin interpolymer is a homogeneously branched substantially linear ethylene/α-olefin interpolymer.

The terms "homogeneous" and "homogeneously-branched" are used in reference to an ethylene/α-olefin polymer (or interpolymer), in which the comonomer(s) is randomly distributed within a given polymer molecule, and all of the polymer molecules have the same or substantially the same comonomer(s)-to-ethylene ratio. The homogeneously branched ethylene interpolymers include linear ethylene interpolymers, and substantially linear ethylene interpolymers.

Included amongst the homogeneously branched linear ethylene interpolymers are ethylene interpolymers, which lack measurable amounts of long chain branching, but do have short chain branches, derived from the comonomer polymerized into the interpolymer, and which are homogeneously distributed, both within the same polymer chain, and between different polymer chains. Commercial examples of homogeneously branched linear ethylene/α-olefin interpolymers include TAFMER polymers supplied by the Mitsui Chemical Company and EXACT polymers supplied by ExxonMobil Chemical Company.

Commercial examples of homogeneously branched substantially linear ethylene/α-olefin interpolymer include ENGAGE Polyolefin Elastomers (The Dow Chemical Company), and AFFINITY Polyolefin Plastomers (The Dow Chemical Company). In addition, the substantially linear ethylene interpolymers are homogeneously branched ethylene polymers having long chain branching. The long chain branches have about the same comonomer distribution as the polymer backbone, and can have about the same length as the length of the polymer backbone. The term, "substantially linear," typically, is in reference to a polymer that is substituted, on average, with 0.01 long chain branches per 1000 total carbons (including both backbone and branch carbons) to 3 long chain branches per 1000 total carbons. The length of a long chain branch is greater than that resulting from the incorporation of one comonomer unit into the polymer backbone.

The substantially linear ethylene interpolymers form a unique class of homogeneously branched ethylene polymers. They differ substantially from the well-known class of conventional, homogeneously branched linear ethylene interpolymers, described by Elston in U.S. Pat. No. 3,645,992, and, moreover, they are not in the same class as conventional heterogeneous branched, "Ziegler-Natta catalyst polymerized" linear ethylene polymers (for example, ultra low density polyethylene (ULDPE), linear low density polyethylene (LLDPE) or high density polyethylene (HDPE), made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

In one embodiment, the ethylene/α-olefin interpolymer has a PRR (Processing Rheology Ratio, as described below) greater than, or equal to, 4, preferably greater than, or equal to, 8, more preferably greater than, or equal to, 12, and even more preferably greater than, or equal to, 18. In one embodiment, the ethylene/α-olefin interpolymer has a PRR from 8 to 70, preferably from 12 to 50, and more preferably from 18 to 30.

Interpolymer viscosity is conveniently measured in poise (dyne-second/square centimeter (d-sec/cm$^2$)) at shear rates within a range of 0.1-100 radian per second (rad/sec), and at 190° C., under a nitrogen atmosphere, using a dynamic mechanical spectrometer (such as a RMS-800 or ARES from Rheometrics), under a dynamic sweep made from 0.1 to 100 rad/sec. The viscosities at 0.1 rad/sec and 100 rad/sec may be represented, respectively, as $V_{0.1}$ and $V_{100}$, with a ratio of the two referred to as RR and expressed as $V_{0.1}/V_{100}$.

The PRR value is calculated by the formula:

$$PRR=RR+[3.82-\text{interpolymer Mooney Viscosity}\ (ML_{1+4} \text{ at } 125° C.)]\times 0.3.$$

PRR determination is described in U.S. Pat. No. 6,680,361, fully incorporated herein by reference. Ethylene/α-olefin interpolymers suitable for the invention can be made by the process described in U.S. Pat. No. 6,680,361 (see also WO 00/26268). Examples of suitable interpolymers include ENGAGE 7487, ENGAGE 7387, and ENGAGE 6386 (all available from The Dow Chemical Company).

An ethylene/α-olefin interpolymer may comprise a combination of two or more embodiments as described herein.

Composition

The inventive composition preferably contains from 60 to 90 weight percent, preferably from 65 to 85 weight percent, and more preferably from 70 to 75 weight percent of the propylene-based polymer, based on the sum weight of the propylene-based polymer and ethylene/α-olefin interpolmer. The inventive composition preferably contains from 10 to 40 weight percent, preferably from 15 to 37 weight percent, and more preferably from 20 to 35 weight percent of the ethylene/α-olefin interpolymer, based on the sum weight of the propylene-based polymer and ethylene/α-olefin interpolymer.

In one embodiment, the composition contains from 5 to 35 weight percent of the fiber filler, preferably from 10 to 30 weight percent, and more preferably from 15 to 25 weight percent, based on the total weight of the composition.

In one embodiment, the composition contains from 15 to 25 weight percent of the fiber filler, preferably from 18 to 20 weight percent, and more preferably from 20 to 25 weight percent, based on the total weight of the composition.

In one embodiment, the composition contains from 5 to 35 weight percent of a nitrogen-containing compound, preferably from 10 to 30 weight percent, and more preferably from 15 to 25 weight percent, based on the total weight of the composition.

In one embodiment, the composition contains from 5 to 35 weight percent of a phosphorus-containing compound, preferably from 10 to 35 weight percent, and more preferably from 15 to 25 weight percent, based on the total weight of the composition.

In one embodiment, the composition has a crystallization temperature, Tc, greater than, or equal to, 110° C., preferably greater than, or equal to, 120° C., and more preferably greater than, or equal to, 130° C., and most preferably greater than, or equal to, 140° C.

In one embodiment, the composition has a HDT, as measured by ASTM D648, than, or equal to, 110° C., preferably greater than, or equal to, 120° C., and more preferably greater than, or equal to, 130° C., and most preferably greater than, or equal to, 140° C.

In one embodiment, the composition does not contain another propylene-based polymer, other than the propylene-based polymer component.

In one embodiment, the composition contains greater than, or equal to, 50 weight percent, preferably greater than, or equal to 60 weight percent, and more preferably greater than, or equal to, 70 weight percent of the propylene-based polymer, based on the total weight of the composition.

In one embodiment, the composition contains less than, or equal to, 40 weight percent, preferably less than, or equal to 35 weight percent, and more preferably less than, or equal to, 30 weight percent of the ethylene/α-olefin interpolymer, based on the total weight of the composition.

In one embodiment, the composition contains no copolymers containing only ethylene and propylene monomer units.

In one embodiment, the composition contains no styrene block copolymers.

In one embodiment, the composition contain only one ethylene/α-olefin interpolymer.

In one embodiment, the composition contain only one propylene-based polymer.

In one embodiment, the composition does not contain an EPDM polymer.

In one embodiment, the composition does not contain an EPR polymer.

In one embodiment, the composition does not contain a block copolymer.

In one embodiment, the composition does not contain a siloxane polymer.

In one embodiment, the composition does not contain a polydimethyl siloxane.

In one embodiment, the composition does not contain a grafted ethylene-based polymer (for example, a maleic anhydride grafted ethylene-based polymer) or a grafted propylene-based polymer (for example, a maleic anhydride grafted propylene-based polymer).

In one embodiment, the composition does not contain a grafted ethylene-based polymer (for example, a maleic anhydride grafted ethylene-based polymer), and does not contain a grafted propylene-based polymer (for example, a maleic anhydride grafted propylene-based polymer).

The composition may further comprise at least one additive. These additives include, but are not limited to, process oils; antioxidants; surface tension modifiers; UV stabilizers; crosslinking agents such as peroxides; antimicrobial agents such as organometallics, isothiazolones, organosulfurs and mercaptans; antioxidants such as phenolics, secondary amines, phosphites and thioesters; antistatic agents such as quaternary ammonium compounds, amines, and ethoxylated, propoxylated or glycerol compounds.

DEFINITIONS

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer), and the term interpolymer as defined hereinafter.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term "ethylene-based polymer," as used herein, refers to a polymer comprising a majority amount of polymerized ethylene, based on the weight of the polymer.

The term "ethylene/α-olefin interpolymer," as used herein, refers to a polymer comprising a majority amount of polymerized ethylene (based on the weight of the interpolymer) and an α-olefin.

The term "ethylene/α-olefin copolymer," as used herein, refers to a polymer comprising a majority amount of polymerized ethylene (based on the weight of the copolymer) and an α-olefin, as the only two monomer types.

The term "propylene-based polymer," as used herein, refers to a polymer comprising a majority amount of polymerized propylene, based on the weight of the polymer.

The term "propylene-based interpolymer," as used herein, refers to a polymer comprising a majority amount of polymerized propylene, based on the weight of the interpolymer, and at least one comonomer.

The terms "blend" or "polymer blend," as used herein, mean a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "nitrogen source," as used herein, refers to a compound (organic or inorganic), and preferably an organic compound, that contains one or more nitrogen atoms.

The term "phosphorus source," as used herein, refers to a compound (organic or inorganic), and preferably an organic compound, that contains one or more phosphorus atoms.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Measurements

By the term "MI," is meant melt index, I2 or $I_2$, in g/10 min, measured using ASTM D-1238-04, Condition 190° C./2.16 kg for ethylene-based polymers (majority weight percent polymerized ethylene based on the weight of the polymer).

By the term "MFR," is meant melt flow rate, measured using ASTM D-1238-04, Condition 230° C./2.16 kg for propylene-based polymers (majority weight percent polymerized propylene based on the weight of the polymer).

Density is measured in accordance with ASTM D-792-00. The density measured was a "quick density," meaning that the density was determined after one hour from the time of molding. Samples were compression molded at 190° C. for six minutes at a low pressure (about 5000-6000 lbs force) hold, and then gradually cooled (15° C./min) at a high pressure (about 15 tons force).

Flexural (Flex) Modulus, One Percent Secant, was measured in accordance with ASTM D-790 on a "5 in×½ in×⅛ in" specimen (see experimental section for injection molding conditions).

Heat Distortion (Deflection) Temperature (HDT)

This test is done on injection molded (see experimental section) ASTM flex bars (ASTM D-790) in order to achieve the test span needed (tensile specimens have too short a neck region). Bar dimensions are "5 in×½ in×⅛ in." The test is run according to ASTM D-648(06). There are two load options for this test, and the data reported is at lower load of 66 psi (0.455 MPa).

Tan Delta

This test is a melt test done on disks cut from a "⅛ inch thick (1 inch diameter)" specimen from an injection molded (see experimental section) ASTM D-790 tensile dog bone specimen. The sample is placed between the two parallel plates of a dynamic mechanical spectrometer, such as an RMS-800 or ARES from Rheometrics.

The tan delta (melt tan delta) test temperature is measured at 190° C. Polymer viscosity is measured in poise (dyne-second/square centimeter ($cm^2$), at shear rates within a range of from 0.1 radians per second (rad/sec) to 100 rad/sec, and at 190° C., under a nitrogen atmosphere, using a dynamic mechanical spectrometer such as an RMS-800 or ARES from Rheometrics. Tan delta values at 0.1 radians per second, at 190° C., are referenced.

Gel Permeation Chromatography

The average molecular weights and molecular weight distributions for ethylene-base polymers are determined with a Gel Permeation Chromatographic system, consisting of a Polymer Laboratories, Model 200, series high temperature chromatograph. The column and carousel compartments are operated at 140° C. for ethylene-based polymers. The columns are three Polymer Laboratories 10-micron Mixed-B columns. The solvent is 1,2,4 trichlorobenzene. The samples are prepared at a concentration of 0.1 gram of polymer in 50 milliliters of solvent. The solvent, used as the mobile phase, and to prepare the samples, contains 200 ppm of butylated hydroxytoluene (BHT). Ethylene-base polymers are prepared by agitating lightly for two hours at 160° C., and propylene-base polymers are dissolved for 2.5 hours. The injection volume is 100 microliters, and the flow rate is 1.0 milliliters/minute. Calibration of the GPC column set is performed with narrow molecular weight distribution polystyrene standards, purchased from Polymer Laboratories (UK), with molecular weights ranging from 580 to 8,400,000. The polystyrene standard peak molecular weights are converted to polyethylene molecular weights using the following equation (as described in Williams and Ward, J. Polym. Sci., Polym. Let., 6, 621 (1968)):

$$M\text{polyethylene} = A \times (M\text{polystyrene})^B,$$

where M is the molecular weight, A has a value of 0.4315 and B is equal to 1.0.

Polyethylene equivalent molecular weight calculations are performed using VISCOTEK TriSEC software Version 3.0. The molecular weights for propylene-based polymers can be determined using Mark-Houwink ratios, according to ASTM D6474.9714-1, where, for polystyrene a=0.702 and log K=−3.9, and for polypropylene, a=0.725 and log K=−3.721. For propylene-based samples, the column and carousel compartments are operated at 160° C.

Differential Scanning Calorimetry

Differential Scanning calorimetry (DSC) can be used to measure crystallinity in ethylene-based (PE) samples (and compositions) and polypropylene-based (PP) samples (and compositions). A sample is pressed into a thin film at a temperature of 190° C. About five to eight milligrams of film sample is weighed and placed in a DSC pan. The lid is crimped on the pan to ensure a closed atmosphere. The sample pan is placed in a DSC cell, and then heated, at a rate of approximately 10° C./min, to a temperature of around 180-200° C. for PE (230° C. for PP). The sample is kept at this temperature for three minutes. Then the sample is cooled at a rate of 10° C./min to −90° C. for PE (−90° C. for PP), and kept isothermally at that temperature for three to five minutes. The sample is next heated at a rate of 10° C./min until complete melting (second heat; around 180° C. for PE and 230° C. for PP). Unless otherwise stated, melting point(s) ($T_m$) and glass transition temperature (Tg) of each polymer sample is determined from the second heat curve obtained from DSC, as described above. The crystallization temperature ($T_c$) is measured from the first cooling curve.

UL 94—Test

This test uses a "½ in×5 in×1/16 in" specimen, which was held at one end (via a clamp) in the vertical position. A Bunsen burner flame was applied to the free end of the specimen for two, 10 second intervals, separated by the time it takes to extinguish after the first ignition. A set of five specimens were tested. The three vertical ratings, V2, V1 and V0 (best rating) indicate that the material was tested in a vertical position and self-extinguished within a specified time, as specified by ASTM D3801, after the ignition source was removed. The vertical ratings also indicate whether the test specimen dripped flaming particles that ignited a cotton indicator located below the sample.

The following examples illustrate, but do not, either explicitly or by implication, limit the present invention. Unless otherwise indicated, all parts and percentages are by weight.

EXPERIMENTAL

I. Different Reinforcing Fillers

The following reinforcing fillers, as shown in Table 2, were evaluated for flame retardant properties.

TABLE 2

| Reinforcing Filler | Physical Shape | Composition | Specific Gravity |
| --- | --- | --- | --- |
| CIMPACT 550C | Plate | Talc | 2.8 |
| POLYFIL DL | Plate | Kaolin | 2.6 |
| POLYFIL DLX | Plate | Kaolin | 2.6 |
| NYGLOS MSTPO | Fiber | Treated wollastonite | 2.9 |
| ASPECT 4000 | Fiber | wollastonite | 2.9 |
| ASPECT 4992 | Fiber | Treated wollastonite | 2.9 |

Batch Mixed Samples
Haake Blending

Formulations, as shown in Tables 3 and 4, were prepared in a heated lab mixer, RHEOMIX 3000 (414 cc bowl capacity) with CAM style blades. To increase batch size slightly, the degree of fill was increased from 60% to 70% of the total mixer capacity. The mixer was attached to a RS5000 torque rheometer drive unit, controlled by System 5, PC based, control/data acquisition software, designed to operate the RS5000 drive. The quality of mixing was observed by constant visual monitoring, and adjustments in temperature were made as needed.

For each formulation, the following conditions were used:
Temperature: 170° C. to 190° C.,
Fill Factor between 60% and 70% by volume,
Air cooling in bowl's zone 2,
RPM: 10 for adding ingredients, and then 55 for mixing, and
Mixing Time: 1500 seconds to 3000 seconds.

Polymer component(s) of each formulation were added to the heated mixer at 10 RPM (to minimize ejection of particles during addition step), the mixing speed was then increased to 55 RPM to get a good polymer melt flux. Additives were then added at measured levels. Mixing continued, until appearance of the sample was well mixed. The mixed formulation was removed and cooled.

Granulation and Compression Molded Plaques for UL-94

Each mixed formulation was granulated in a COLOR-TRONIC M103 granulator to form a granulated sample.

Each granulated samples was pressed into a "4 in×4 in×0.0625 in" plaque, using a CARVER hydraulic press, set at 180° C. and 25000 psi. A TEFLON coated stainless steel chase, with exterior dimensions of "4 in×6 in×1/16 in" was used to mold the plaques for UL-94 testing. The chase containing the sample was sandwiched between two PTFE (polytetrafluoroethylene) coated aluminum sheets, in the following layered configuration: 1) chase holder, 2) MYLAR sheet, 3) stainless steel polished plate, 4) MYLAR sheet, 5) PTFE coated aluminum sheet, 6) chase with sample, 7) PTFE coated aluminum sheet, 8) MYLAR sheet, 9) stainless steel polish plate, and 10) MYLAR sheet. This layered configuration was placed into the heated platens, and a pressure of 25000 psi was applied for five to six minutes. Next, the molded sample was moved to chilled platens (set point 15° C.) for at least a three-minute cooling period. Samples were removed from the chase, and the flash was trimmed off using lab scissors. Five sample bars (size ½"×5"×1/16") for UL94 testing were cut from injected molded plaques (4"×6"×1/16") using a manual punch press with expulsion, Model No. D.G.D., equipped with a Swiss made NAEF, ASTM die—size ½"×5".

Injection Molding Samples for UL-94 Test

Granules (from compounds prepared on batch mixers) or pellets produced on the ZSK-25 extruder (as discussed below) were injection molded on an ARBURG ALL-ROUNDER, 80 ton, injection molding machine. This molder was equipped with a "4 inch by 6 inch" plaque tool with a thickness of one sixteenth of an inch. Specimens for UL 94 were die-cut from these plaques.

The primary concerns during injection molding were to minimize thermal decomposition of the polymer during injection molding, and to avoid as much as possible "tiger striping" in these thin plaques. Because "high isotactic index" homopolymer polypropylene grades were used, the peak melt temperatures ranged from 165 to 169° C. To avoid thermal decomposition, and still melt the polypropylene, barrel temperatures were set between 170° C. and 190° C. For thin specimens, drag at the wall of the tool was minimized by increased tool temperature. The tool temperature was initially set to 60° C., but later to as high as 75° C., to avoid higher melt temperature and/or tiger stripes. Injection rates were examined between 10 and 20 cubic centimeters per sec (cc/s) to find the optimum speed for each material.

These samples were molded at 15 bar (1 bar equals 14.5 psi) back pressure setting. This was the polymer or specific pressure, as opposed to the hydraulic pressure. The polymer pressure is equivalent to the hydraulic pressure times the intensification ratio (ratio of the "surface area of the hydraulic ram" to the "surface area of the screw"). A setting of 15 bar is therefore a factor of 10 lower than the "100 psi hydraulic pressure" it was intended to match. It should be noted that a higher back pressure is known to increase melt homogenization.

The compounds were molded at a flat barrel profile of 190° C. The wollastonite-containing samples molded acceptably at these conditions, although there was slight tiger striping observed when filling a "16th inch thick," "six inch long" plaque. At these conditions, there was evidence that the three component additive system was causing a film to form on the mold. The barrel temperatures were reduced, and the back pressure was increased (to achieve better mixing without the higher barrel temperature), until elimination of the "film build-up" on the tool, and elimination of the tiger stripes on the "16th inch" thick plaques were observed.

Filler Loadings 10 wt %-20 wt %

This study evaluated the performance difference between "10 weight percent" (based on total weight of formulation) loadings of two grades of kaolin, a platy talc, and the three grades of wollastonite. Representative grades were also evaluated at "15 weight percent" filler loadings. The formulations and flame retardant (FR) properties are shown in Table 3.

TABLE 3

Formulations (10 wt % and 15 wt % filler) and FR Properties - All Haake Blended and Compression Molded

| Molded Sample | 6-1 | 6-2 | 6-3 | 6-4 | 6-5 | 6-6 | 6-7 | 6-8 | 6-9 |
|---|---|---|---|---|---|---|---|---|---|
| D18[1] | 45 | 45 | 45 | 45 | 45 | 43 | 43 | 43 | 43 |
| EO87[2] | 19 | 19 | 19 | 19 | 19 | 18 | 18 | 18 | 18 |
| POLYFIL DLX | 10 | | | | | | | | |
| POLYFIL DL | | 10 | | | | | | 15 | |
| CIMPACT 550C | | | 10 | | | | | | 15 |
| NYGLOS MSTPO | | | | 10 | | | | | |
| ASPECT 4000 | | | | | 10 | | | | |
| ASPECT 4992 | | | | | | 10 | 15 | | |
| Phosphorus/Nitrogen Flame Retardant A | 25 | 25 | 25 | 25 | 25 | 25 | 24 | 24 | 24 |
| UL-94 t1 (sec) | 13 | 6 | 6 | 6 | 7 | 7 | 8 | >130 | 23 |
| t2 (sec) | >180 | 28 | 15 | 20 | 12 | 24 | >87 | BC[3] | BC[3] |
| Rating | NR[3] | V-0 | V-0 | V-0 | V-0 | V-0 | V-2 | NR[4] | NR[4] |

[1]D18 is a polypropylene homopolymer (Flex Modulus = 2070 MPa, HDT = 120° C., density = 0.90 g/cc).
[2]EO87 is a homogeneously branched substantially linear ethylene/butene copolymer (Tg = −57° C., Tm = 37° C., Tan delta = 2.1 (190° C., 0.1 rad/sec), HDT (failed), density = 0.86 g/cc, Mooney Viscosity (ML 1 + 4 at 125° C.) = 44).
[3]BC = burned to clamp (sample failed).
[4]NR = no rating (sample failed).

At "10 weight percent" filler loading, all of the samples, with the exception of Sample 6-1 (POLYFIL DLX) achieved a UL V-0 rating, as seen in Table 2 above. At "15 weight percent" filler loading, only Sample 6-7 (ASPECT 4992 and D18 matrix) demonstrated signs of improved intumescent behavior when tested. To reduce sagging and dripping in some of the samples, a higher viscosity (lower MFR) propylene-based polymer was used—see Table 4 (UL-94 performance of a higher viscosity polypropylene containing "15 weight percent" and "20 weight percent" filler loadings).

TABLE 4

Formulations (15 wt % and 20 wt % filler) and FR Properties - All Haake Blended and Injection Molded

| Molded Sample # | 12-1 | 12-2 | 12-3 | 12-5 | 12-6 |
|---|---|---|---|---|---|
| D18 (MFR 8) | 42.84 | 42.84 | | 44.96 | |
| D02* (MFR 2) | | | 42.84 | | 44.96 |
| EO 87 | 18.36 | 18.36 | 18.36 | 11.24 | 11.24 |
| ASPECT 4992 | 15 | | 15 | 20 | 20 |

TABLE 4-continued

Formulations (15 wt % and 20 wt % filler) and FR Properties - All Haake Blended and Injection Molded

| Molded Sample # | 12-1 | 12-2 | 12-3 | 12-5 | 12-6 |
|---|---|---|---|---|---|
| ASPECT 4000 | | 15 | | | |
| Phosphorus/Nitrogen Flame Retardant A | 23.8 | 23.8 | 23.8 | 23.8 | 23.8 |
| UL-94 t1 (sec) | 9 | 8 | 5 | 10 | 10 |
| t2 (sec) | 19 | >150 | 20 | >140 | 27 |
| Rating | V-0 | BC** | V-0 | NR*** | V-0 |

*D02 is a polypropylene homopolymer (Flex Modulus = 2070 MPa, HDT = 130° C., density = 0.90 g/cc)
**BC: Burned to clamp (sample failed).
***"NR" No Rating (sample failed).

A faster self-extinguishment time on the second ignition of the sample was observed in Sample 12-1. This allowed the samples (12-1 and 12-3), containing at "15 weight percent" filler loading and a "70:30 PP:elastomer" level, to achieve "UL-94 V-0" rating. Sample 12-2 (D18 based "70:30 PP:elastomer") burned to the clamp, since the sagging sample broke any char layer that was forming, and exposed virgin polymer to the flame. The V-0 rating could not be obtained with the "20 weight percent" filler loading in Sample 12-5. The higher melt flow of the PP (MFR 8) gave longer extinguishment times in the second ignition. Using the polypropylene homopolymer, with a lower MFR (MFR 2), enabled the use of a "20 weight percent" filler loading, and gave a V-0 rating (see Sample 12-6).

Overall, higher filler levels caused more challenges to the intumescent FR additives. With increasing filler level, the other factors, such as the melt flow rate of the propylene-based polymer and the FR additive level, become more critical to passing UL-94 test. As shown in Table 4, at "15 weight percent" filler loading, the samples based on either D18 (8 MFR) and D02 (2 MFR), were able to achieve a "UL-94 V-0" rating. At "20 weight percent," only the sample based on D02 achieved this rating.

Extruded Samples

Twin screw compounding was done on a ZSK 25 MEGA-COMPOUNDER, fully intermeshing twin screw extruder (available from Coperion). This extruder delivered "82 N-m per shaft" at 1200 rpm. The extruder had a chilled feed block and eleven individual controlled heater zones. The extruder was equipped with three K-Tron gravimetric feeders, with single screw augers for controlled feed of polymer pellets. A fourth, K-Tron gravimetric feeder was equipped with a twin screw auger for controlled feed of powder ingredients, and was positioned to feed a side-arm extruder. The side arm extruder entered the main extruder at the half way point between feed throat and the die. The extruder was equipped with a four-hole die.

Two-Pass Compounding

A "two pass" compounding process was used to feed the FR additive and the reinforcing filler into the extruder. The reinforcing filler was added to the side arm extruder on the first pass to form a TPO pre-compound, and pellets of the TPO pre-compound were collected. The FR additive was then added to the pre-compound in a second pass, to achieve the final extruded formulation.

The TPO pre-compound was prepared under standard conditions, feeding ingredients at 50 lb/hr, and utilizing a flat temperature profile of 200° C. The inserts associated with the "talc stack" and the vacuum devolatilization vents were checked before and after each run. The melt was extruded through a four-hole die, and chilled in a water bath, before cutting the strands to make pellets. The residual heat in the pellets made drying unnecessary.

The primary concern of the second pass was to avoid degradation of the intumescent mechanism by thermal decomposition or exposure to moisture. Temperature management required attention not only to the temperature settings, but also to the heat generated by shear heating within the twin screw extruder.

Two methods were employed to control temperature on the second pass. Barrel temperature settings were ramped, starting high to melt the propylene-based polymer, and then lowered in subsequent zones, such that the polymer would be closer to 170° C., where the FR additives were added with the side arm extruder. The RPM of the extruder was set at 200, while targeting an output of 30 lb/hr, in order to reduce the specific energy, and therefore the shear heating. This helped minimize the differential between the temperature set points and the actual measured melt temp.

One-Pass Compounding

The FR additives were fed into the feed throat of the extruder, and the reinforcing filler was fed to the extruder using a side-arm. This formulation was utilized as a control. For the second test, the powdered additive and the wollastonite fiber were pre-blended, and added with the side-arm inlet. Processing the wollastonite with un-melted pellets led to excessive breakage of the fiber and potential wear on the extruder (the Mohs hardness of wollastonite is 4.5).

One-pass compounding was later replicated by blending the wollastonite and the FR additives in a HENSCHEL mixer. The pre-blend was then added to the side-arm extruder for feeding the twin screw extruder. This caused problems due to the low bulk density of the pre-blend. To ensure that material did not back up in the feed throat, the twin screw extruder's RPM was increased to 600, and the throughput was decreased by 20 percent to 40 lb/hr. Both factors increased the specific energy, and therefore the melting temperature of the polymer.

When the fibers were processed only once through the extruder, less breakage of the fibers was observed, which resulted in less reduction of the reinforcing effects of the fibers. This resulted in a higher flex modulus for the system containing "20 weight percent" of the ASPECT 4992 (Sample 70-2 of Table 5). This also resulted in a roughly "20% higher flex modulus" as compared to the "20 weight percent filler" sample, produced via the two step compounding process (Sample 66-6). This improved flex modulus was slightly higher than the modulus that was achieved with a "25 weight percent" filler loading (Sample 66-8). These results are shown in Table 5 below.

TABLE 5

Extruders - One Pass and Two Pass - ALL Extruded and Injection Molded

| Molded Sample | 66-7 Two-Pass | 66-6 Two-Pass | 70-2 One-Pass | 66-8 Two-Pass |
|---|---|---|---|---|
| D02 | 42.84 | 39.34 | 39.34 | 35.84 |
| EO 87 | 18.36 | 16.86 | 16.86 | 15.36 |
| ASPECT 4992 | 15 | 20 | 20 | 25 |
| Phosphorus/Nitrogen Flame Retardant A | 23.8 | 23.8 | 23.8 | 23.8 |
| UL-94 t1 (sec) | 5 | 5 | 5 | 8 |

TABLE 5-continued

Extruders - One Pass and Two Pass -
ALL Extruded and Injection Molded

| Molded Sample | 66-7 Two-Pass | 66-6 Two-Pass | 70-2 One-Pass | 66-8 Two-Pass |
|---|---|---|---|---|
| t2 (sec) | 24 | 14 | 32 | >82 |
| t1 + t2 (sec) | 29 | 19 | 37 | >100 |
| Rating | V-0 | V-0 | V-0 | V-0/V-1* |
| Flex Mod (kpsi)/MPa | 295/2034 | 319/2200 | 388/2676 | 365/2517 |
| HDT (° C.) | 107 | 109 | — | 112 |

*one out of five bars tested burned >30 sec

Additional Formulations

The following additional formulations, as shown in Table 6, were examined using the UL-94 flammability test. Each sample formulation was prepared by Haake blending as described above. Each mixed formulation was granulated, and then compression molded, as discussed above, into plaques for UL-94 test specimens. Both samples burned to the clamp (failed). The presence of the MAH-grafted ethylene-based polymer and the siloxane polymer did not improve the intumescent behavior of these samples.

TABLE 6

Additional Formulations

| | Sample 1 parts | Sample 2 parts |
|---|---|---|
| D18 | 42.84 | 42.84 |
| EO 87 | 18.36 | 18.36 |
| ASPECT 4000 | 15 | 15 |
| MAH-G-PE* | 0 | 2 |
| Siloxane Polymer Masterbatch** | 1.5 | 1.5 |
| Phosphorus/Nitrogen Flame Retardant A | 23.3 | 23.8 |
| IRGANOX B225 | 0.2 | 0.2 |

*A maleic anhydride grafted ethylene-based polymer, 0.8 wt % MAH, I2 = 1.25 g/10 min (190° C., 2.16 kg).
**DOW CORNING MB50-002 (siloxane polymer dispersed in a low density polyethylene)

Although the invention has been described in certain detail through the preceding specific embodiments, this detail is for the primary purpose of illustration. Many variations and modifications can be made by one skilled in the art, without departing from the spirit and scope of the invention, as described in the following claims.

The invention claimed is:

1. A polyolefin composition comprising:
    A) a propylene-based polymer having a flex modulus of greater than 1500 MPa and a Heat Distortion Temperature of greater than 100° C.;
    B) an ethylene/α-olefin interpolymer having Tg of less than −30° C., a tan delta, measured at 0.1 radians/s at 190° C., of less than 3, a Heat Distortion Temperature that is greater than, or equal to, the peak melting temperature of the ethylene/α-olefin interpolymer, measured by differential scanning calorimetry; and
    C) a fiber filler; and
    D) a nitrogen source and/or a phosphorus source, wherein at least one source is derived from at least one organic compound, or salt thereof; and
    wherein the weight ratio of the propylene-based polymer: ethylene/α-olefin interpolymer (A:B) is from 9:1 to 6:4.

2. The composition of claim 1, wherein the filler is a calcium-based filler.

3. The composition of claim 1, wherein the sum weight of components A, B, C and D is greater than, or equal to, 95 weight percent, based on the total weight of the composition.

4. The composition of claim 1, wherein the composition has a heat deflection temperature (HDT) of greater than about 100° C., and a flexural modulus of greater than about 1930 MPa.

5. The composition of claim 1, wherein the fiber filler is present in an amount greater than 15 weight percent, based on the weight of the composition.

6. The composition of claim 1, wherein the nitrogen source is derived from at least one organic compound selected from the group consisting of melamine, melamine cyanurate, melamine borate, melamine phosphate, melamine polyphosphate, melamine pyrophosphate, ethylene diamine, and tris(hydroxyethyl)isocyanurate.

7. The composition of claim 1, wherein the phosphorus source is derived from at least one compound selected from the group consisting of a phosphate compound, a phosphinate compound, a phosphonate compound, a polyphosphate compound, and phosphine oxide.

8. The composition of claim 1, wherein the propylene-based polymer is a propylene homopolymer that has a flex modulus of greater than 1930 MPa.

9. A polyolefin composition comprising:
    A) a propylene-based polymer having a flex modulus of greater than 1500 MPa and a Heat Distortion Temperature of greater than 100° C.;
    B) an ethylene/α-olefin interpolymer having Tg of less than −30° C., a tan delta, measured at 0.1 radians/s at 190° C., of less than 3; and
    C) a fiber filler; and
    D) a nitrogen source and/or a phosphorus source, wherein at least one source is derived from at least one organic compound, or salt thereof; and
    wherein the weight ratio of the propylene-based polymer: ethylene/α-olefin interpolymer (A:B) is from 9:1 to 6:4.

10. The composition of claim 9, wherein the filler is a calcium-based filler.

11. The composition of claim 9, wherein the composition has a heat deflection temperature (HDT) of greater than about 100° C., and a flexural modulus of greater than about 1930 MPa.

12. The composition of claim 9, wherein the fiber filler is present in an amount greater than 15 weight percent, based on the weight of the composition.

13. The composition of claim 9, wherein the nitrogen source is derived from at least one organic compound selected from the group consisting of melamine, melamine cyanurate, melamine borate, melamine phosphate, melamine polyphosphate, melamine pyrophosphate, ethylene diamine, and tris(hydroxyethyl)-isocyanurate.

14. The composition of claim 9, wherein the phosphorus source is derived from at least one compound selected from the group consisting of a phosphate compound, a phosphinate compound, a phosphonate compound, a polyphosphate compound, and phosphine oxide.

15. An article comprising at least one component formed from the composition of claim 1.

16. The composition of claim 1, wherein the fiber filler is present in an amount greater than, or equal to, 15 weight percent, based on the weight of the composition, and wherein the propylene-based polymer has a melt flow rate less than, or equal to, 3 g/10 min.

17. An article comprising at least one component formed from the composition of claim 9.

18. The composition of claim 9, wherein the fiber filler is present in an amount greater than, or equal to, 15 weight percent, based on the weight of the composition, and wherein the propylene-based polymer has a melt flow rate less than, or equal to, 3 g/10 min.

\* \* \* \* \*